(12) United States Patent
Pokress

(10) Patent No.: US 6,169,791 B1
(45) Date of Patent: *Jan. 2, 2001

(54) SYSTEM AND METHOD FOR LEAST COST CALL ROUTING

(75) Inventor: Matthew C. Pokress, Cambridge, MA (US)

(73) Assignee: Mediacom Corporation, Burlington, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/900,315

(22) Filed: Jul. 25, 1997

(51) Int. Cl.$^7$ .................................................. H04M 15/00
(52) U.S. Cl. ...................... 379/114; 379/91.02; 379/111; 379/121; 379/127
(58) Field of Search ..................................... 379/111, 112, 379/114, 115, 119, 121, 130, 140, 144, 91.01, 91.02, 93.01, 93.03

(56) References Cited

U.S. PATENT DOCUMENTS

| | | | | |
|---|---|---|---|---|
| 5,425,085 | * | 6/1995 | Weinberger et al. | 379/111 |
| 5,473,630 | * | 12/1995 | Penzias et al. | 379/114 |
| 5,519,769 | * | 5/1996 | Weinberger et al. | 379/112 |
| 5,606,602 | * | 2/1997 | Johnson et al. | 379/114 |
| 5,621,787 | * | 4/1997 | McKoy et al. | 379/114 |
| 5,668,995 | * | 9/1997 | DeCiutiis et al. | 379/130 |
| 5,699,416 | * | 12/1997 | Atkins | 379/127 |
| 5,732,133 | * | 3/1998 | Mark | 379/93.02 |
| 5,764,741 | * | 6/1998 | Barak | 379/114 |
| 5,793,854 | * | 8/1998 | Kashepava | 379/114 |
| 5,799,071 | * | 8/1998 | Azar et al. | 379/113 |
| 5,799,072 | * | 8/1998 | Vulcan et al. | 379/114 |
| 5,878,122 | * | 3/1999 | White et al. | 379/115 |
| 5,881,139 | * | 3/1999 | Romines | 379/130 |
| 5,953,398 | * | 9/1999 | Hill | 379/112 |

* cited by examiner

Primary Examiner—Paul Loomis
Assistant Examiner—Binh K. Tieu
(74) Attorney, Agent, or Firm—Testa, Hurwitz & Thibeault, LLP

(57) ABSTRACT

A least cost call routing system operates in conjunction with one or more telephones disposed in a location to provide least cost telephone call routing using a selected one of a number of commercial telephone carriers. A central server stores a plurality of telecommunications carriers and associated billing rates. A user's computer registers with the central server by providing certain user identification information. The central server generates a customized database of telecommunications carriers and associated billing rates for the user in response to the location of the user. The customized database is stored on the user's PC for use in routing telephone calls along a least cost route. The central server establishes an account for the user at each of the telecommunications carriers in the user's database. The user's PC periodically contacts the central server to receive updates to the customized database.

3 Claims, 17 Drawing Sheets

User Information

Credit Card

First Name — 64a: Jed
Last Name — 64b: Tucker
Date of Birth mm/dd/yy — 66: 06/07/71

Credit Card Type — 68: Visa
Credit Card Number — 70: 0123456789102233
Expiration Date mm/dd/yy — 72: 3/98

Company Name (Optional) — 84

Address & Phone Number (Phone name must be at this address)

Street Address — 74a: 2 Riverside Drive
City — 74b: Bedard
State — 74c: MA
Zip — 74d: 01730-

Phone Number — 76: (617) 206-8222
Long Distance Carrier — 78: AT&T True USA
Monthly Phone Bill — 80: 150

Modem

Select The Modem PhoneMiser Will Use For Updates — 82
Sportster 33600 Fax PC Plug and Play OK — 85    Cancel

FIG. 3

Dialing Options — 236

Intercept Delay ⊞ [ 2 ▶ ]

☑ Stutter Dial Tone Enabled

To access an outside line (first dial) [ 9 ] for local and [ 9 ] for long distance

[ OK ]  [ Cancel ]

PhoneMiser Personal Edition

File  Options  Help

| 276-8471 | Outgoing Calls | Carriers | Updates |

Show Calls From: 05/11/97   To: 05/11/97

PhoneMiser Outgoing Call Log

| Date & Time | Phone Number | Rate Center | State | Length | Rate | Cost | Savings | Carrier Name |
|---|---|---|---|---|---|---|---|---|
| 05/12/97 10:02:37 AM | (212)440-3200 | NEW YORK | NY | 00:07:11 | $0.095 | $0.69 | $1.32 | Telco |
| 05/12/97 12:19:04 PM | (310) 305-7038 | LOS ANGELES | CA | 00:16:39 | $0.094 | $1.57 | $2.68 | Telegroup |
| 05/14/97 09:15:24 PM | (202) 964-2962 | WASHINGTON | DC | 00:13:14 | $0.095 | $1.26 | $0.14 | Telco |
| 05/15/97 07:17:09 AM | (212)440-3200 | NEW YORK | NY | 00:28:34 | $0.092 | $2.63 | $0.27 | TelCom |
| 05/15/97 11:39:16 AM | (310)305-7038 | LOS ANGELES | CA | 00:19:17 | $0.094 | $1.81 | $3.19 | Telegroup |
| 05/15/97 01:24:37 PM | (203)323-4966 | STAMFORD | CT | 00:13:29 | $0.094 | $1.26 | $2.24 | Directel |
| 05/15/97 02:29:38 PM | (212)745-2859 | NEW YORK | NY | 00:06:52 | $0.092 | $0.64 | $1.11 | TelCom |
| 05/15/97 12:02:54 PM | (305)866-3498 | MIAMI | FL | 00:11:15 | $0.095 | $1.07 | $1.93 | Telco |
| 05/16/97 02:13:21 PM | (313)665-1862 | DETROIT | MI | 00:23:09 | $0.094 | $2.18 | $3.82 | Telegroup |

| Savings To Date $549.21 | Cost This Screen $27.69 | Savings This Screen $54.22 |

242

SYSTEM AND METHOD FOR LEAST COST CALL ROUTING

RELATED APPLICATIONS

This application is related to two patent applications entitled, Apparatus for Use in a Telephone Call Processing System" and "Isolation Device for Use in a Telephone Call Processing System," filed on even date herewith and incorporated herein by reference.

This application is a continuing prosecution application of U.S. Ser. No. 08/900,315, filed Jul. 25, 1997.

FIELD OF THE INVENTION

The invention relates generally to the field of least cost telephone call routing. In particular, the invention relates to a method which generates and utilizes a customized database of telecommunications carriers for routing telephone calls along a least cost route.

BACKGROUND OF THE INVENTION

The growth and deregulation of the telephone industry over the past several years has given birthto hundreds of commercial long distance carriers. Presently, more than 450 long distance carriers operate in the United States, with an average of more than 30 of such carriers serving each state. The resulting competition has caused long distance carriers to offer specific rate plans to gain market share. These rate plans include special pricing for various calling patterns during specific time periods. Long distance subscribers (i.e., consumers and businesses) have been overwhelmed these often confusing rate plans, each promising big discounts and cost savings. Typically, most subscribers use a single major carrier (e.g., AT&T, MCI, Sprint) for long distance telephone service. For example, more than 90% of consumers presently use one of the three major long distance carriers. Few subscribers know that hundreds of smaller long distance carriers exist. Moreover, few subscribers know how to get access to the superior rates offered by these carriers, or that they can select each carrier on a call-by-all basis.

Various systems aimed at providing subscribers with access to multiple carriers on a call-by-call basis, i.e., least cost call routing systems, have been described in the art. For example, U.S. Pat. Nos. 4,122,308, 4,585,094, 4,751,728, 5,289,536, 5,400,395, 5,420,914, 5,425,084, 5,425,085, 5,473,630, 5,519,769, and 5,553,124 describe least cost call routing devices and methods. To date, however, the technology described in these patents has not resulted in a least cost call routing system of widespread commercial acceptance with household and small office/home office consumers.

About 40% of the households in the United States have a personal computer (PC), and that percentage is expected to increase to approximately 70% by the millennium. The small office/home office market is expected to grow to 15 million PC-equipped organizations during the same time period.

It is therefore a principle object of the present invention to provide a least cost call routing system allows subscribers, including household and small office/home office consumers, to save significantly and automatically on a call-by-call basis for each telephone call made anywhere in the world.

SUMMARY OF THE INVENTION

A least cost call routing system operates in conjunction with one or more telephones disposed in a location to provide least cost telephone call routing using a selected one of a number of commercial telephone carriers. A central server stores a plurality of telecommunications carriers and associated billing rates. A user's computer registers with the central server by providing certain user identification information. The user identification information includes user credit card information. The central server verifies the user credit card information in real time. If the user credit card information is verified, the central server generates a customized database of telecommunications carriers and associated billing rates for the user in response to the location of the user. In one mbodiment, the customized database only includes telecommunications carriers which offer service to the user's location. In another embodiment, the customized database includes active telecommunications carriers which currently offer service to the user's location and inactive carriers which will offer service at a predetermined activation date.

The customized database is transmitted to the user's PC and stored on the user's PC for use in routing telephone calls along a least cost route. The central server establishes an account for the user at each of the telecommunications carriers in the user's customized database. Once the accounts are established at the telecommunications carriers, the user's PC communicates directly with the carriers to route telephone calls. The user's PC periodically contacts the central server to receive updates to the customized database.

The criteria the system utilizes to determine a least cost carrier for a call includes: (i) the location from which the call originates; (ii) the destination called, (iii) the distance between the origin of the call and the destination of the call; (iv) the time of day; (v) the day of the week; (vi) free minutes time offered by carriers; and (vii) volumes of calls made with a specific carrier.

BRIEF DESCRIPTION OF THE DRAWINGS

This invention is described with particularity in the appended claims. The above and further advantages of this invention may be better understood by referring to the following description taken in conjunction with the accompanying drawings.

FIG. 3 is a pictorial view of a registration screen of a least cost telephone call routing system according to the invention.

FIG. 15 is a pictorial view of a dialing options screen for allowing a user to customize a least cost telephone call routing system according to the invention.

FIG. 17 is a pictorial view of an outgoing calls screen of a least cost telephone call routing system according to the invention.

DETAILED DESCRIPTION OF THE INVENTION

Figure 1:
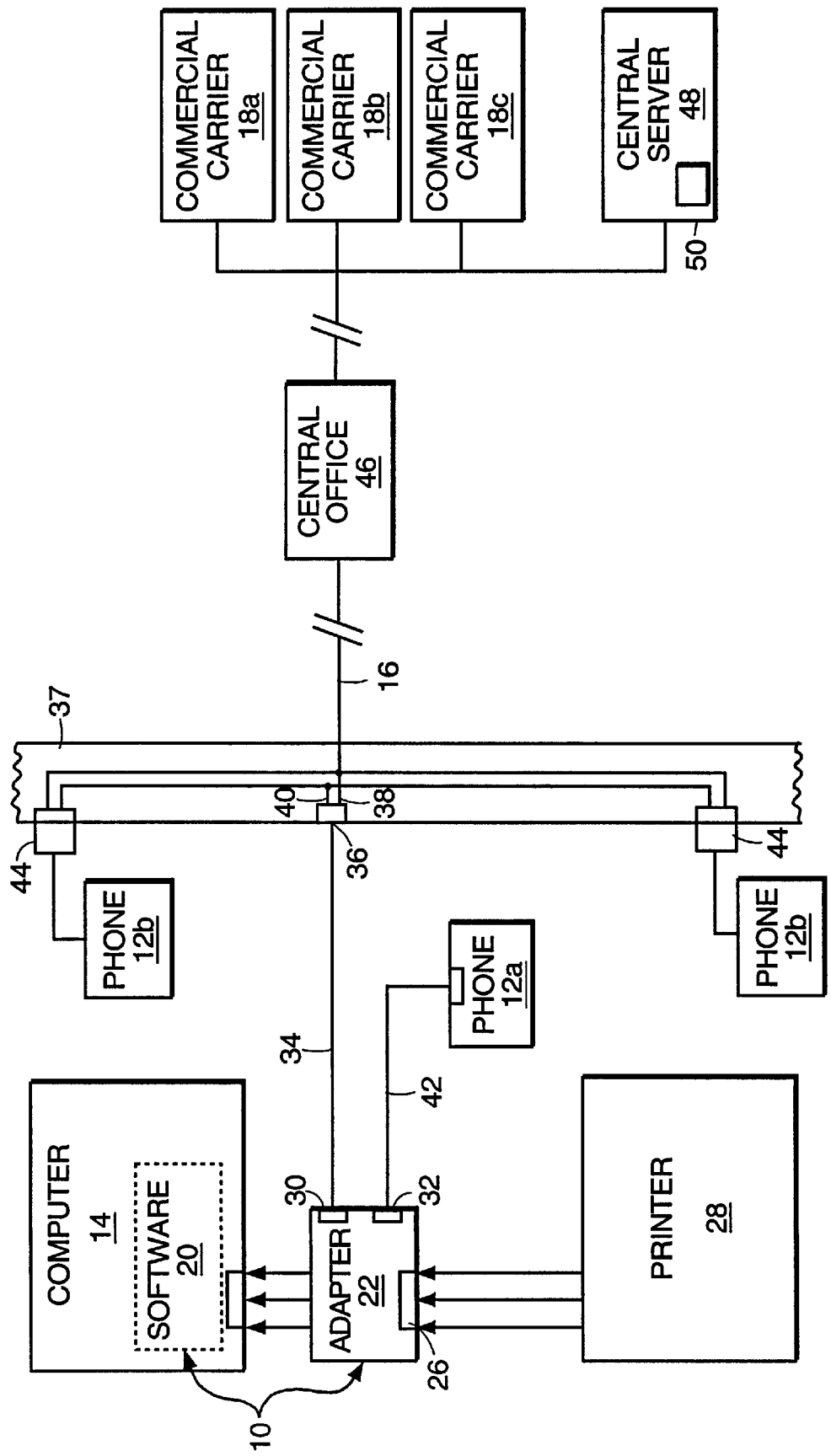
FIG. 1 is a block diagram of a least cost call routing system incorporating the principles of the invention.

FIG. 1 illustrates a least cost call routing system incorporating the principles of the invention. The system 10 operates in conjunction with one or more standard telephones 12a, 12b and a personal computer (PC) 14 running any operating system (e.g., Windows 95) to provide least cost telephone call routing over the public switched telephone network (PSTN) 16 using a selected one of a number of commercial telephone carriers 18a, 18b, 18c.

The system 10 includes software 20 and a specialized adapter 22 that connects the PC 14, the telephones 12a, 12b, and the PSTN 16. The 22 adapter plugs into the parallel port 24 of the PC 14 and includes a connector 26 for a printer 28 and a pair of telephone jacks 30, 32. The first jack 30 electrically connects the adapter 22, via a two line (each line being a pair of wires) telephone cable 34 and the wall jack 36, to the first and second telephone lines 38, 40 within a wall 37 of the location (e.g., a home or building). The PSTN is electrically connected to the first telephone line 38. The second jack 32 electrically connects, via another telephone cable 42, to an optional telephone 12a that can be located adjacent the PC 14. The telephones 12b located throughout the location are electrically isolated from the first telephone line 38 and electrically connected to the second telephone line 40 via a line isolation device 44.

The adapter 22 acts as a hub so that the incoming and outgoing calls to and from the telephones 12a, 12b are routed through the system 10. The PC 14 should, however, be turned on for the system 10 to operate. Otherwise, the adapter 22 serves as a pass-through device that allows the telephones 12a, 12b to connect directly to the central office 46 (i.e., the local exchange carrier) via the PSTN 16. When the PC 14 is turned on, the software 20 may be set up to run unobtrusively in the background. Other software applications may be running on the PC 14 while the software 20 is running.

Before using the system 10, a user installs the software 20 on the PC 14 and enters various user information in response to queries from the software. After storing the user information, the software 20 places a telephone call to a central server 48. The central server receives the user information from the software 20 and provides rate data for the various commercial carriers 18a, 18b, 18c to the PC 14. The central server's database 50 includes rate data for a large number of commercial carriers 18a, 18b, 18c. In one embodiment, the database 50 is limited to rates associated with telephone calls outside of the area code of the user. In another embodiment, the database includes rates associated with telephone calls inside and outside of the user's area code. This process with be described in more detail below in the discussion of FIG. 2 and FIG. 7.

To use the system 10, a user picks up one of the telephones 12a, 12b (i.e., the off-hook or originating state) and dials a number using the keypad on the telephone. The adapter 22 includes circuitry, described in detail in the related application entitled "Apparatus for Use in a Telephone Call Processing System", that temporarily interrupts the connection between the telephone and the PSTN 16 for outgoing telephone calls. More specifically, the circuitry interrupts the AC signals and passes the DC signals between the telephone and the PSTN 16. The circuitry routes the dialed number to the software 20 and represents to the central office 46 that (i) the telephone number has not been dialed, and (ii) the telephone remains in the off-hook or originating state. The system 10 does not include an internal current source or power generation device. Therefore, the system 10 taps two existing sources, i.e., the PC 14 and the PSTN 16, for power (i.e., current). The system taps (i) the PSTN 16 to provide current to the telephone and certain circuitry within the call processing module during the interruption period, and (ii) the PC 14 to provide current to the remaining certain circuitry within the call processing module.

The software 20 uses the dialed number to determine if the destination is outside of the user's area code. If the destination is within the user's area code, the software 20 causes the circuitry to connect to the central office 46 for placing the call. Otherwise, the software 20 uses the database 50 of rate data to select the commercial carrier having the lowest rate for the call. The criteria the software 20 utilizes to determine a least cost carrier for a call includes: (i) the location from which the call originates; (ii) the destination called; (iii) the distance between the origin of the call and the destination of the call; (iv) the time of day; (v) the day of the week; (vi) free minutes time offered by carriers; and (vii) volumes of calls made with a specific carrier. The software 20 takes into account the distance between the origin of the call and the destination of the call because some telecommunications carriers have distance sensitive rates. The software 20 takes into account the volume of calls made with a specific carrier because certain carriers offer progressive discounts based upon the number of calls or the total minutes of calls made using that particular carrier. The software adds a prefix to the dialed telephone number, which includes a code for the selected carrier. The software causes the circuitry to reconnect to the central office 46 and directs the central office to pass the call to the selected commercial carrier. This process of determining whether the software should select a least cost carrier for an outgoing call will be described in more detail below in the discussion of FIG. 14.

In one embodiment, the software 20 also considers the traffic of the telecommunications carriers. If one telecommunications carrier is congested, the software 20 can route the telephone call via the carrier offering the next best rate.

Figure 2:
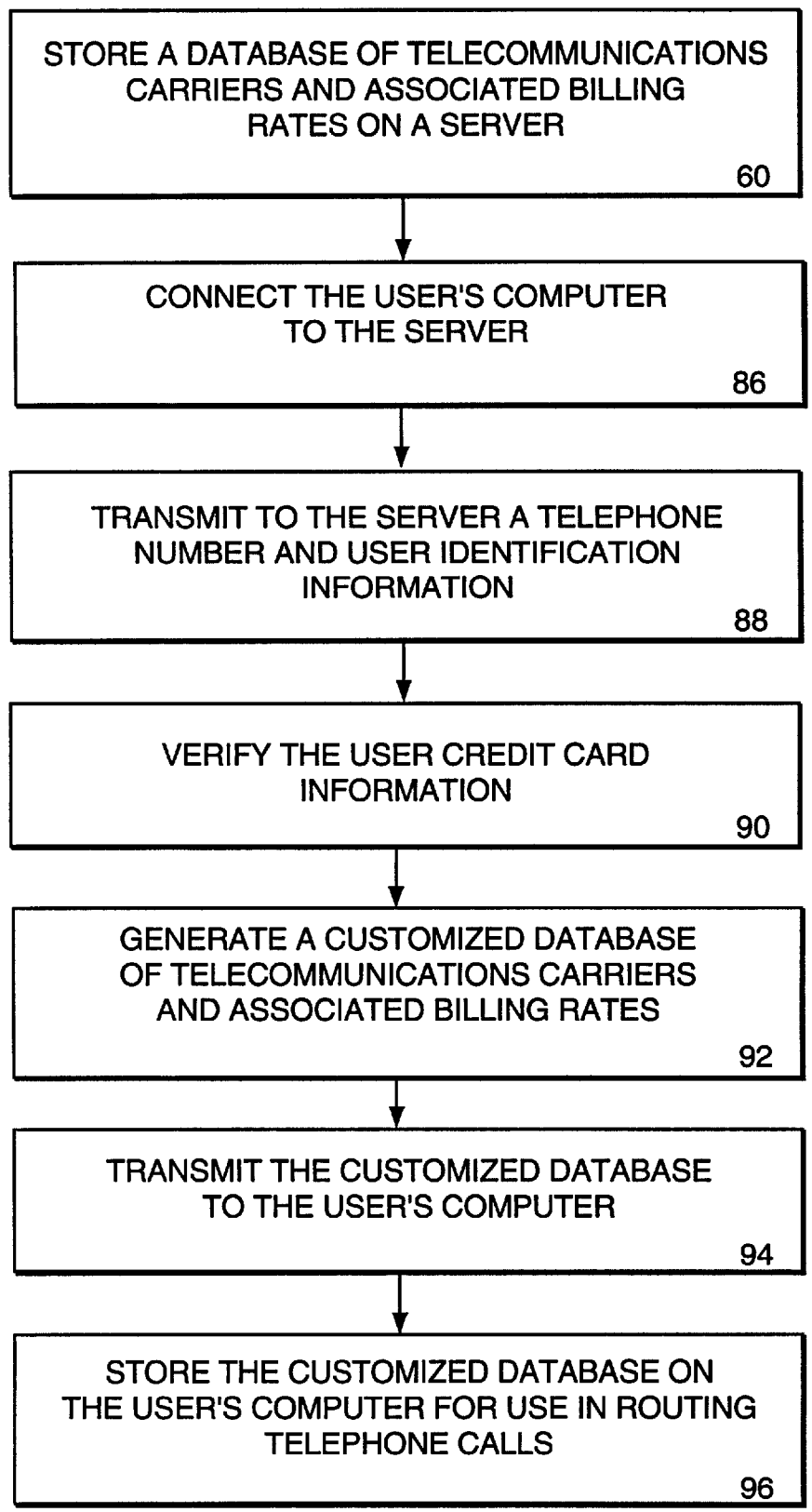
FIG. 2. is a flow chart representation of the steps performed by the user and central server to register the user with the central server.

FIG. 2 is a flow chart representation of the steps performed by the user and central server 48 to register the user with the central server 48. In step 60, the central server 48 stores a database 50 of various commercial telecommunications carriers 18a, 18b, 18c and their associated billing rates. As described above, before using the system 10, the user installs software 20 on the user's PC 14. After the software 20 is installed, in one embodiment, the registration screen 62 shown in FIG. 3 appears on the user's PC 14. The registration screen 62 queries the user for information including user identification information, credit card information, company information, phone number information, and modem information. The registration screen 62 includes fields 64a 64b for the user's name, a field 66 for the user's date of birth 66, a credit card type field 68, a credit card number field 70, a field 72 for the expiration date of the credit card entered in fields 68 and 70, address fields 74a, 74b, 74c, 74d for the user's address (which also is the billing address for the credit card entered in fields 68 and 70), a phone number field 76, a long distance carrier field 78, a monthly phone bill field 80, and a modem field 82. In one embodiment, the user is able to enter multiple phone numbers. This embodiment is useful for users that have multiple telephone lines at one location. In one embodiment, the registration screen 62 includes a company name field 84 for the user to enter the company which is utilizing the software 20. In one embodiment, drop-down boxes are provided for the user to select information for several of the fields. Once the user has entered all of the required information into the registration screen 62, the user selects the OK button 85.

Referring again to FIG. 2, after the user has entered the necessary information in the registration screen 62 and selected the OK button 85, the user's PC 14 is connected to the central server 48 in step 86. In one embodiment, the user's PC 14 is connected to the central server 48 over the user's telephone line. In another embodiment, the user's PC 14 connects to the central server 48 via the internet, whether by telephone other means. In this embodiment, the user registers with the central server 48 via the internet. In step 88, the software 20 transmits to the central server 48 the information entered into the registration screen 62. Once the central server 48 receives the information entered into the registration screen 62, in step 90, the central server 48 contacts the credit card company entered into the credit card type field 68 to verify the user's credit card information. In step 90, the central server 48 verifies the user's credit card information in real time while the user's PC 14 remains connected to the central server 48.

Once the user's credit card information is verified, the central server 48 generates a customized database of telecommunications carriers and associated billing rates for the user's location in step 92. The customized database also includes the associated carrier access codes and associated call routing instructions for each carrier. To generate the customized database, the central server 48 accesses the database 50 and determines the telecommunications carriers which offer service to the user's location. In one embodiment, the central server 48 looks at the state entered in the address field 74c to determine the telecommunications carriers 18a, 18b, 18c which offer service to the user's location and the associated billing rates which apply to the user's location. In another embodiment, the central server 48 looks at the area code of the telephone number entered. in the phone number field 76 to determine which telecommunications carriers 18a, 18b, 18c offer service to the user's location and the associated billing rates. In yet another embodiment, the central server 48 also considers the central office code of the telephone number entered in the phone number field 76 to determine which telecommunications carriers 18a, 18b, 18c offer service and the associated billing rates. In one embodiment, tie telecommunications carriers 18a, 18b, 18c included in the customized database include interstate and international commercial carriers. In another embodiment, the billing rates included in the customized database are limited to billing rates associated with telephone calls outside the user's local calling area. A method for determining which area codes are within the user's local calling area is described in detail below in the discussion of FIG. 4.

In one embodiment, the database 50 of the central server 48 includes a list of active telecommunications carriers which currently offer service. In another embodiment, the database 50 also includes list of inactive telecommunications carriers which do not currently offer service to any locations or which will offer service to additional locations at predetermined activation dates. Each inactive telecommunications carrier becomes an active telecommunications carrier on its corresponding activation date. In this embodiment, the central server 48 selects the active telecommunications carriers which currently offer service to the user's location and the inactive telecommunications carriers which will offer service to the user's location at a predetermined activation date. The central server includes the user's customized database the selected active telecommunications carriers, the selected inactive telecommunications carriers and the corresponding activation dates.

In one embodiment, the central server 48 also includes effective periods for each of the billing rates. The effective period is the time period during which the rate can be used by the software 20 to determine a least cost carrier. In another embodiment, the central server 48 includes in the customized database billing rates which are currently active and may have a corresponding activation date and billing rates which are net currently active, but which have a corresponding activation date.

Once the central server 48 has generated the customized database of telecommunications carriers 18a, 18b, 18c and associated billing rates, the central server 48 transmits the customized database to the user's PC 14 in step 94. In an embodiment in which the user's PC 14 connects to the central server via the internet the user's PC downloads the customized database from the central server via the internet. In step 96 the customized database is stored on the user's PC 14 for use by the system 10 in routing telephone calls originating from the user's telephones 12a, 12b along a least cost route. Once the user has registered with the central server 48, the user is considered a subscriber by the central server 48. In one embodiment, the central server 48 also assigns a customer identification number to the user. The customer identification number will be used to identify the user when the user makes additional contacts with the central server 48. In another embodiment, a password is associated with the user's identification number for use by the central server 48 in identifying the user in future communications with the user.

Once the customized database is stored on the user's PC 14, the user may use the system 10 to route telephone calls along the least cost route. As described above, to use the system 10, a user picks up one of the telephones 12a, 12b (i.e., the off-hook state) and dials a number using the keypad on the telephone. The adapter 22 includes circuitry, that temporarily interrupts the connection between the telephone and the PSTN 16 for outgoing telephone calls. The circuitry routes the dialed number to the software 20 and represents to the central office 46 that the telephone is not in use (i.e., the on-hook state). The software 20 uses the dialed number to determine if the destination is outside of the user's local calling area. If the destination is within the user's local calling area, the software 20 causes the circuitry to connect to the central office 46 for placing the call. Otherwise, the software 20 uses the customized database of telecommunications carriers and associated billing rates to select the commercial carrier 18a, 18b, 18c having the lowest rate for the call. The software causes the circuitry to reconnect to the central office: 46 and directs the central office to pass the call to the selected commercial carrier. The telephone call is then completed using the least cost telecommunications carrier.

Figure 4:
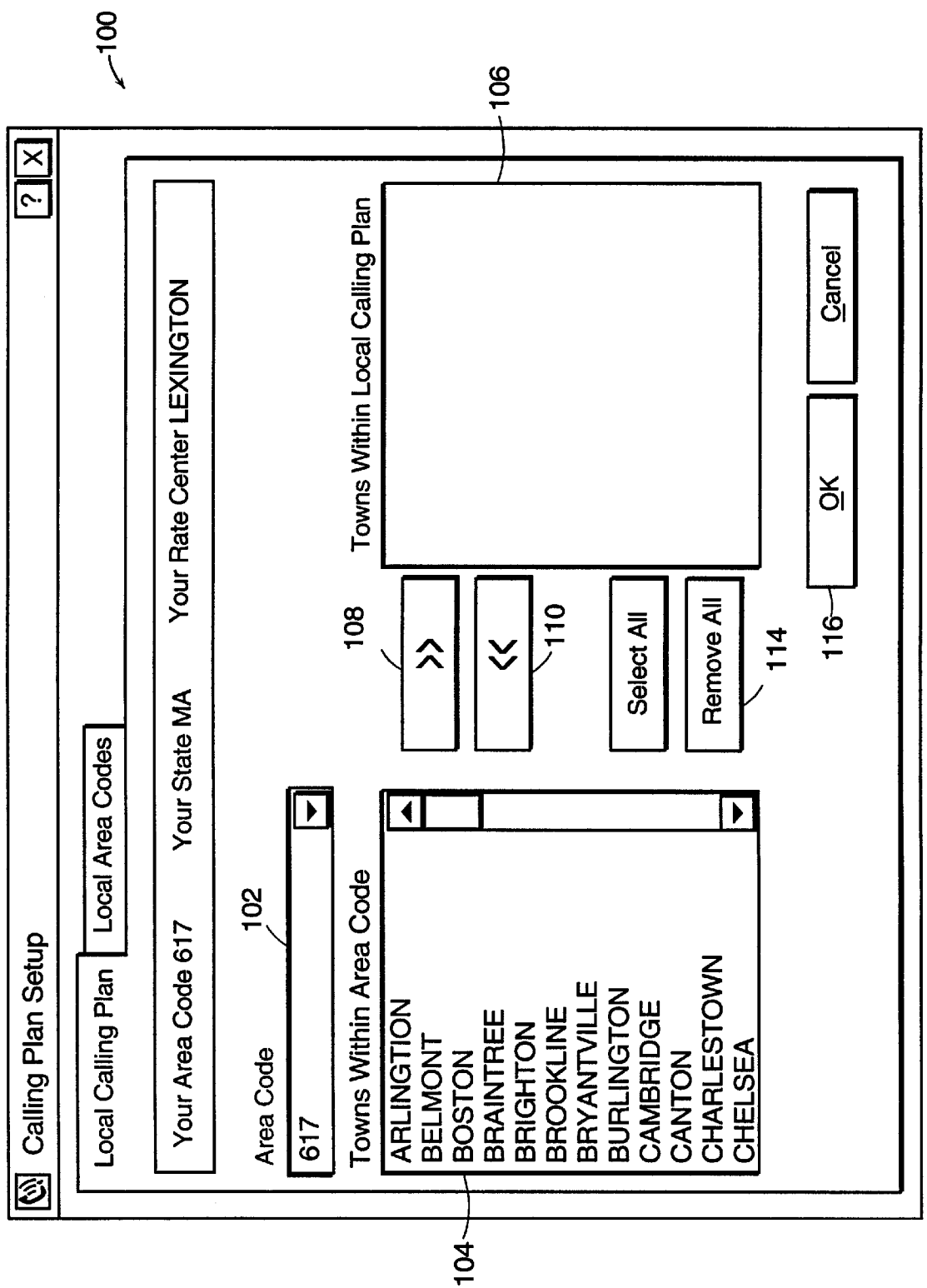
FIG. 4 is a pictorial view of a calling plan setup screen for inputting a user's local calling plans into a least cost telephone call routing system according to the invention.

Some local calling plans enable a user to receive flat rate local service for towns which do not normally fall within the user's flat rate area. FIG. 4 is a calling plan setup screen 100 which enables a user to inform the software 20 which town the user receives flat rate local service. This information is utilized by the software 20 to determine if a least cost carrier should be selected for a particular telephone call. The calling plan setup screen 100 includes an area code field 102, a field 104 listing the towns within the area code displayed in the area code field 102, and a field 106 which indicates which towns are located within the user's local calling plan. To select a town to be added to the field 106 listing the towns in the user's local calling plan, the use highlights the town in field 104 and selects button 108. The town will then be listed in the field 106 labeled Towns Within Local Calling Plan. To select all the towns listed in field 104 labeled Towns Within Area Code, the user selects the Select All button 110. To identify towns within a different area code, the user selects the area code from the drop down box in the field 102 labeled Area Code. To remove a town from the field 106 labeled Towns Within Local Calling Plan, the user highlights the town to be removed and selects the button 112. The will remove the city or town form the field 106 labeled Towns Within Local Calling Plan. To remove all of the towns for the field 106 labeled Towns Within Local Calling Plan, the user selects the Remove All button 114. Once the appropriate towns have been placed in the field 106 labeled Towns Within Local Calling Plan, the user selects the OK button 116.

Figure 5:
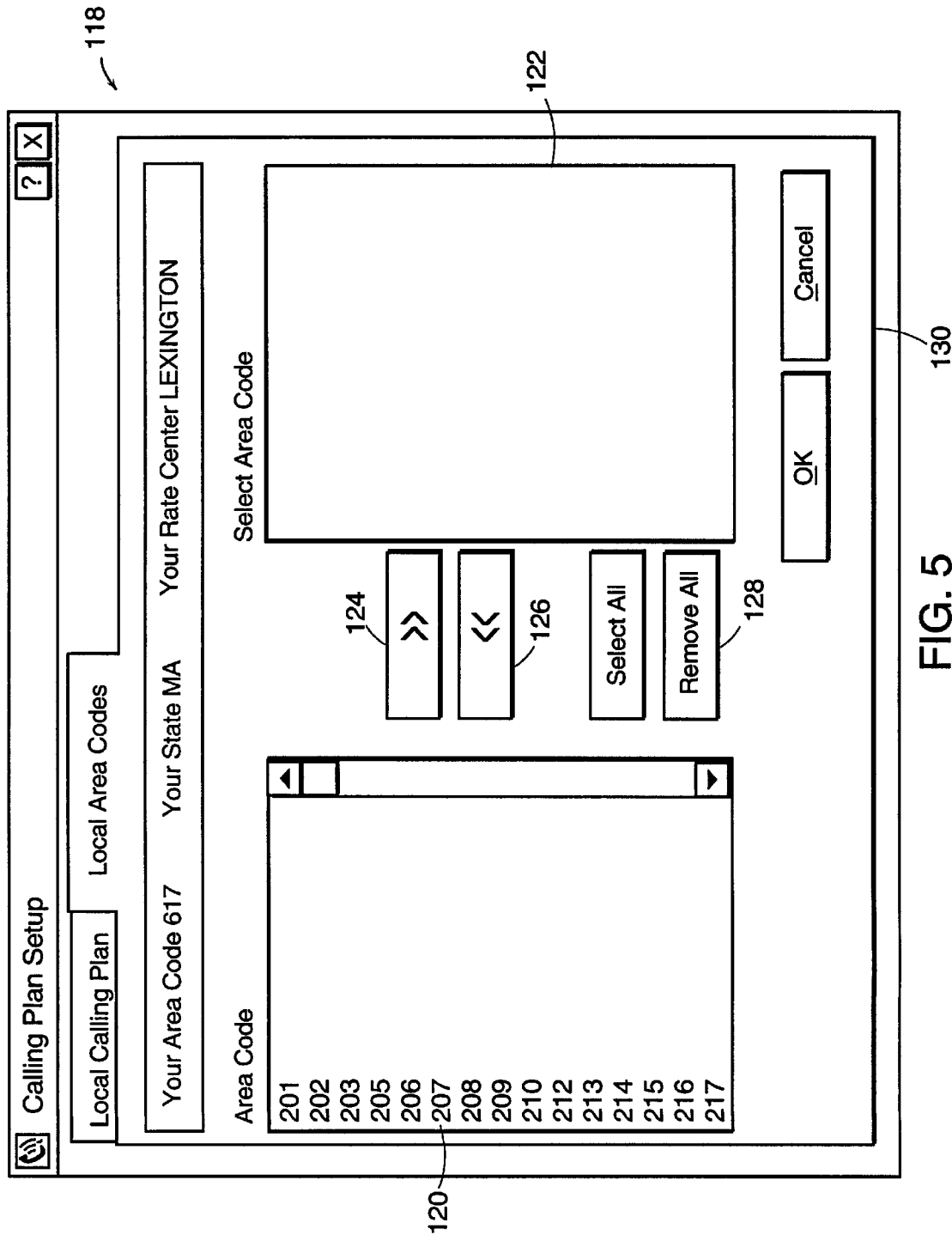
FIG. 5 is a pictorial view of another calling plan setup screen for allowing the user to input area codes which are local calls for the user into a least cost telephone call routing system according to the invention.

To compensate for users who are located in towns or cities which border other states or area codes, in one embodiment, the software 20 allows a user to inform the software 20 of area codes for which the user receives local flat rate service. FIG. 5 shows a local area codes screen 118 which allows the user to input area codes which are local calls for the user. This information is utilized by the software 20 to determine if a least cost carrier should be selected for a particular telephone call. The local area codes screen 118 lists the area code of the user's location, the state in which the user is located, and the user's local rate center. The local area codes screen 118 includes an Area Codes field 120 and a Selected Area Codes field 122. The Area Codes field 120 lists all the possible area codes which the user may select as local area codes. To select an area code to be listed in the Selected Area Codes field 122, the user highlights the desired area code in the Area Codes field 120 and selects the button 124. The area code will then be listed in the Selected Area Codes field 122. To remove an area code from the Selected Area Codes field 122, the user highlights the area code to be removed and selects the, button 126. This will remove the area code fro the Selected Area Codes field 122. To remove all of the area codes from the Selected Area Codes field 122, the user selects the Remove All button 128. Once the appropriate area codes have been placed in the Selected Area Codes field 122, the user selects the OK button 130.

Figure 6:
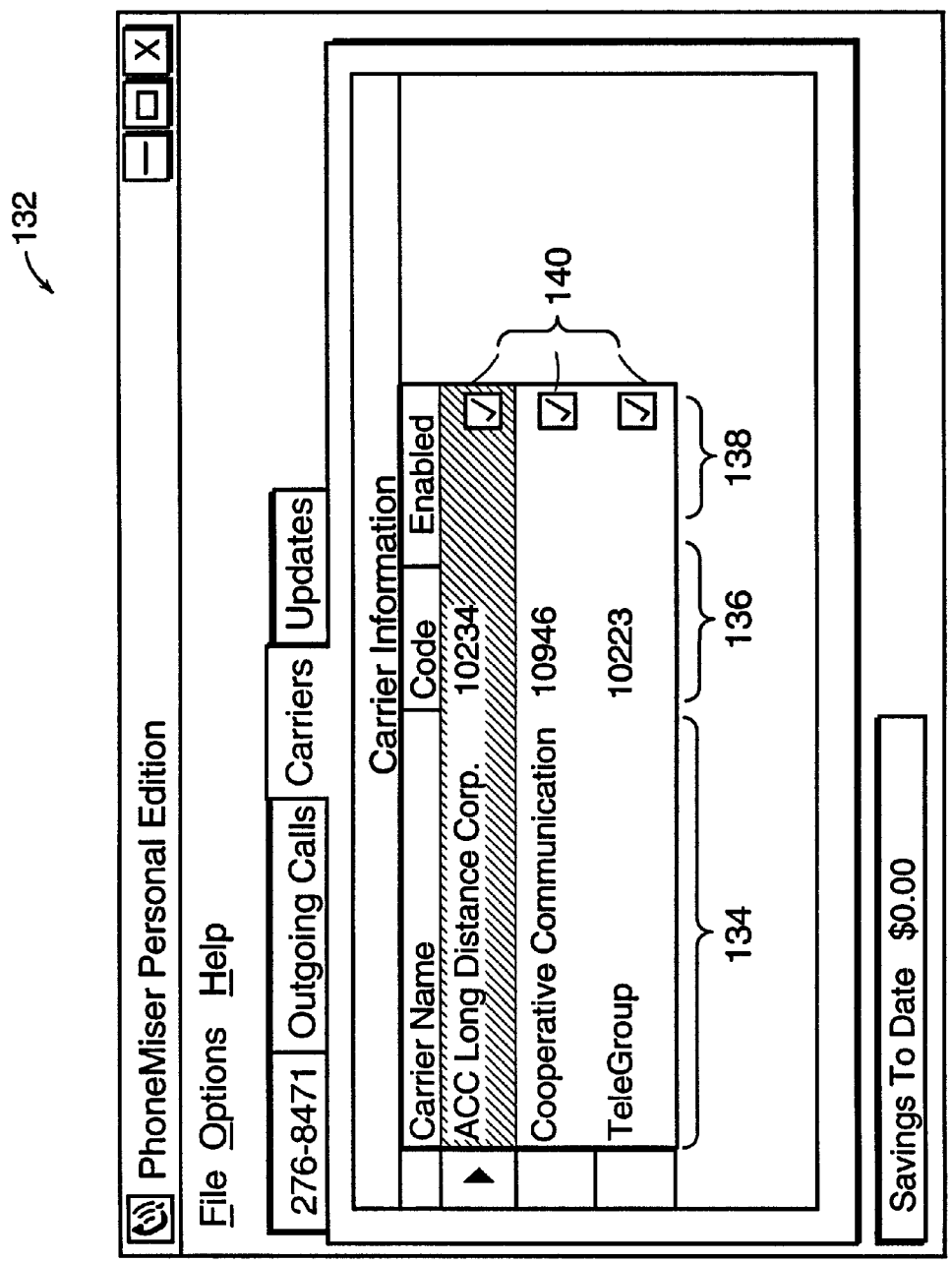
FIG. 6 is a pictorial view of a telecommunications carrier screen for allowing the user to disable certain telecommunications carriers according to the invention.

After the customized database of telecommunications carriers i s stored on the user's PC 14, in one embodiment, the user may view the list of telecommunications carriers which the system 10 will utilize to select a least cost carrier for a telephone call. FIG. 6 shows a telecommunications carrier screen 132 according to one embodiment of the invention. The telecommunications carriers screen 132 includes a first column 134 which lists the names of the telecommunications carriers, a second column 136 which lists the carrier identification code (CIC) number for each carrier, and a third column 138 which indicates which carriers are enabled. The absence of a "check mark" 140 in the third column 138 indicates that the associated telecommunications carrier will not be selected by the software 20 to route an outgoing call. The user may enable or disable service from a telecommunications carrier by checking or unchecking the box in the enable column 138 for that carrier.

Figure 7:
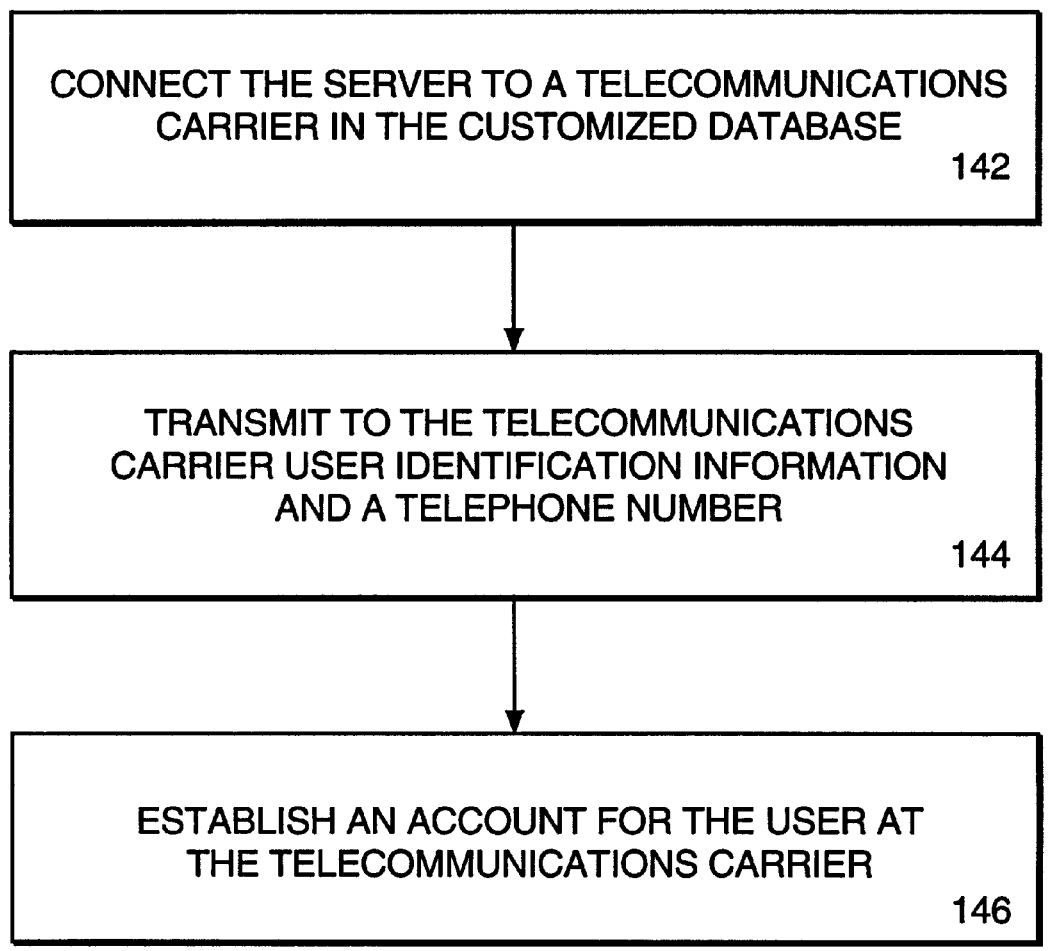
FIG. 7 is a flow chart representation of the steps performed by ihe central server to establish accounts for the user at each telecommunications carrier.

FIG. 7 is a flow chart illustrating the steps performed by the central server 48 to establish accounts for the user at each telecommunications carrier in the user's customized database. To establish the accounts, in step 142 the central server 48 connects to one of the telecommunications carriers 18a, 18b, 18c in the user's customized database. In step 144 the central server 48 transmits to the telecommunications carrier the user identification information received by the central server 48 during the registration process described above in the discussion of FIGS. 2 and 3. The user's telephone number is included in the information sent to the telecommunications carrier so that the telecommunications carrier can establish an account for the user's telephone number and will route telephone calls originating from the user's telephone number. In step 146 the central server 48 establishes an account for the user at the telecommunications carrier. The central server repeats steps 142, 144, and 146 for each telecommunications carrier in the user's customized database. Once an account has been established for the user at the telecommunications carrier, the user's PC 14 communicates directly with the telecommunications carrier.

If any of the information the user provided to the central server 48 during the registration process, the user may update the information at the central server 48. For example, if the user moves, changes credit cards or changes the phone number on which the system 10 operates, the user must register these changes with the central server 48. The central server 48 will then update the telecommunications carriers 18a, 18b, 18c on the user's customized database. If the user does not update the central server 48, the may not route telephone calls originating from the user's telephone number. To update the central server 48, the user enters the updated information in a screen similar to the registration screen 62 described above and shown in FIG. 3.

Figure 8:
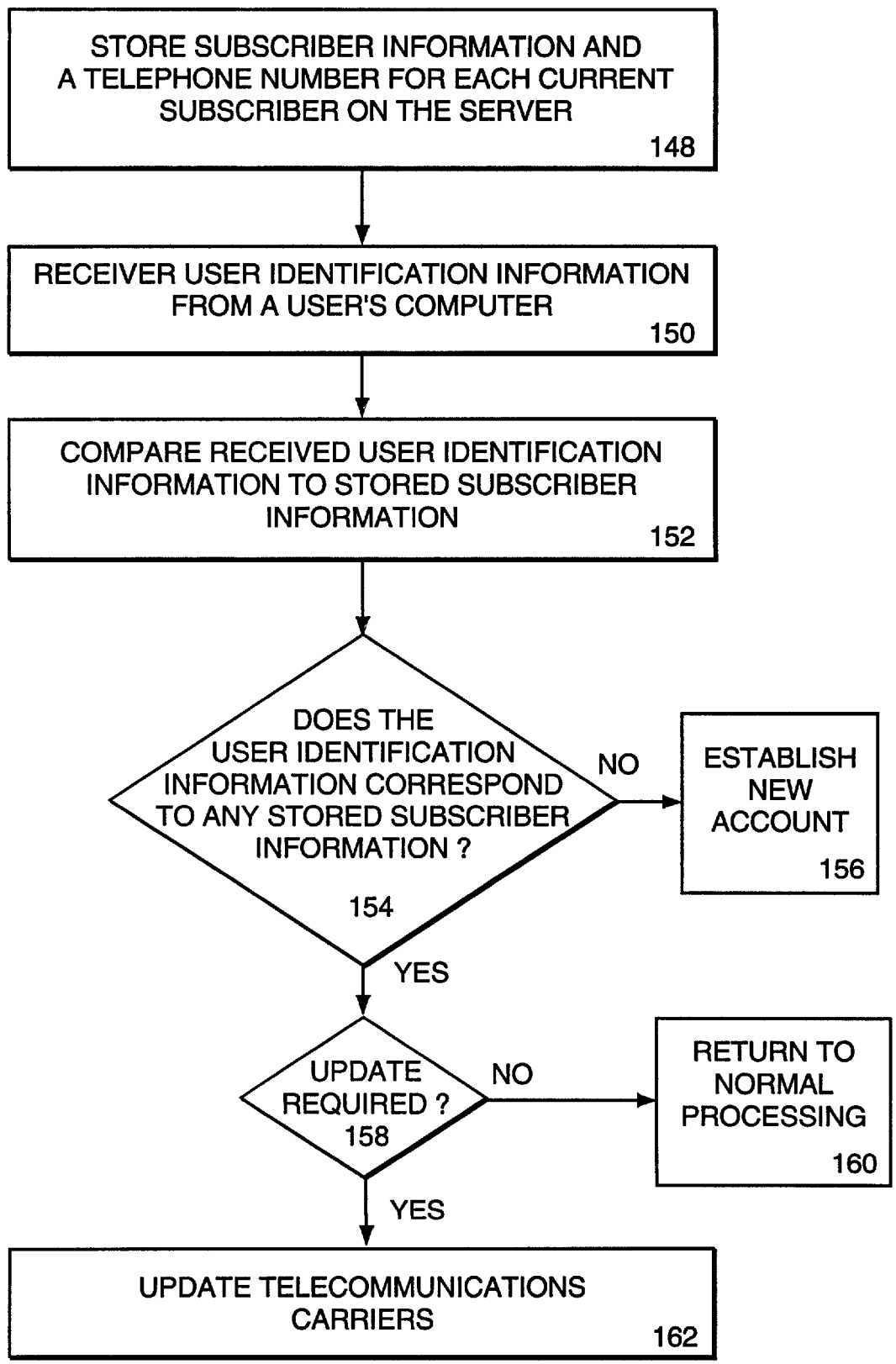
FIG. 8 is a flow chart representation of the steps performed by the central server to update subscriber information at each telecommunications carrier.

FIG. 8 is a flow chart illustrating the steps performed by the central server 48 to update subscriber information at each telecommunications carrier. The central server 48 stores subscriber information and a telephone number for each user that has registered with the central server 48 and is a current subscriber (step 148). When a user's PC 48 connects with the central server 48, the central server 48 receives user identification information identifying the user (step 150). Upon receipt of user identification information, in step 152 the central server 48 compares the received user identification information to the stored subscriber information. In step 154 the central server 48 determines if the received user identification information corresponds to the stored subscriber information.

In one embodiment, the central server 48 first examines the user identification information to see if it contains a customer identification number. If the user identification information does not contain a customer identification number, the central server 48 will proceed to step 156 and establish a new account for the user as described above in the discussion of FIG. 2. If the user identification information contains a customer identification number, the customer identification number is compared to the stored subscriber information to determine if the customer identification number corresponds to the customer ID number of any the current subscribers. If the customer ID number corresponds to the customer ID of a current subscriber, the central server 48 determines if any of the user identification information has been modified in step 158 and requires updating. In one embodiment, before proceeding to step 158, the central server 48 verifies a password received from the user. If the password is invalid, the central server 48 rejects the call.

If an update is not required, the central server 48 proceeds to step 160 returns to normal processing and determine the purpose of the call from the user's PC 14. If the user identification has been modified and an update is required, the central server 48 proceeds to step 162 and updates its database and all of the telecommunications carriers in the user's customized database.

Figure 9:
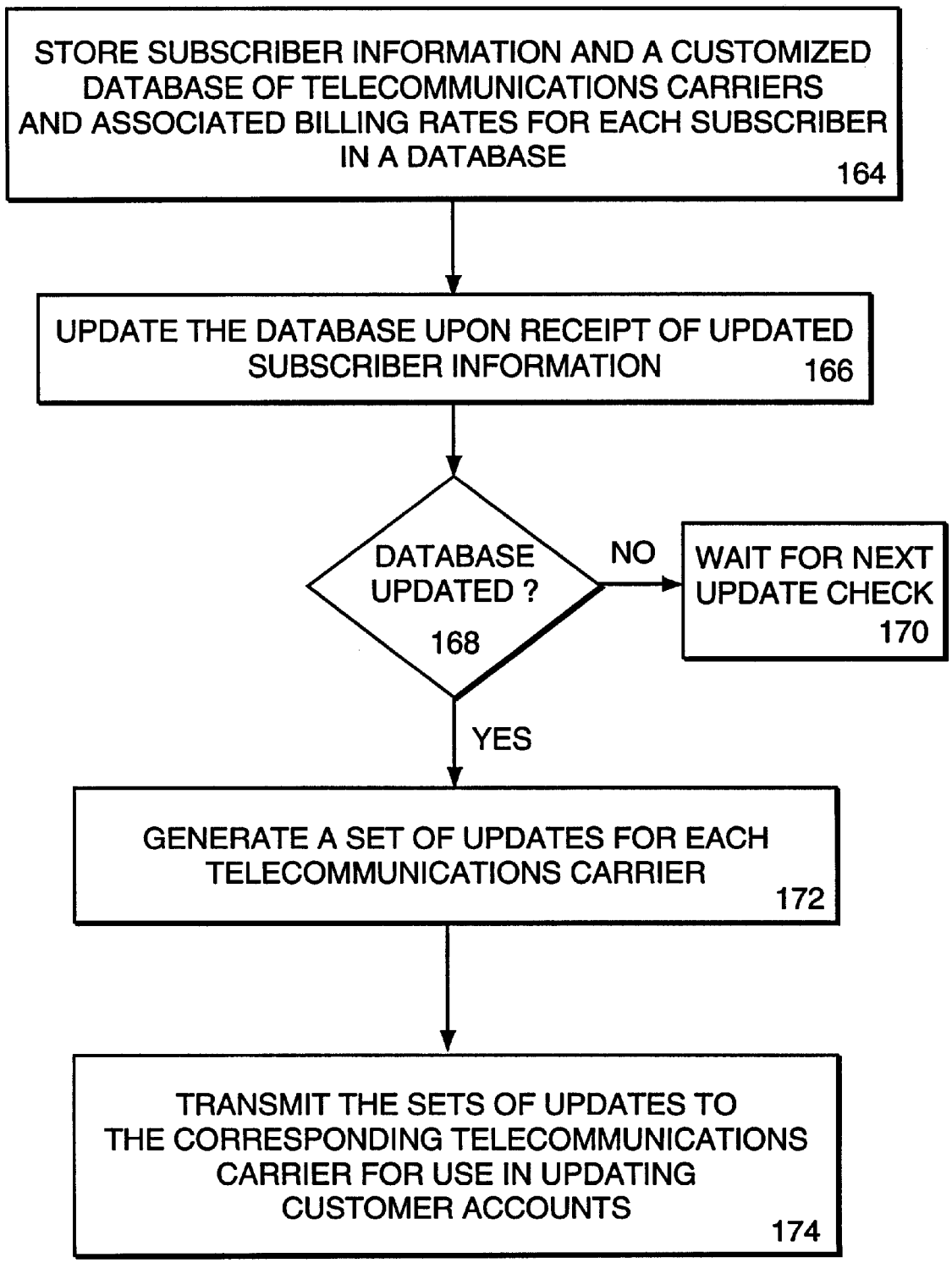
FIG. 9 is a more detailed flow chart representation of the steps performed by the central server to update subscriber information at each telecommunications carrier.

FIG. 9 is a more detailed flow chart illustrating the steps performed by the central server 48 to update subscriber information at each telecommunications carrier. As described above, the central server 48 stores subscriber information and a customized database of telecommunications carriers for each current subscriber (step 164). Also as described above, the central server 48 updates its database upon the receipt of updated subscriber information (step 166). The central server 48 periodically determines if its database of subscriber information has been updated (step 168). If the database has not been updated, the central server 48 proceeds to step 170 and waits for the next update check. In one embodiment, the central server 48 determines on an hourly basis if its database of subscriber information has been updated. If the database has been updated, the central server 48 generates a set of updates for each telecommunications carrier in step 172. In step 174, the central server 48 transmits the sets of updates to the corresponding telecommunications carrier 18a, 18b, 18c for use by the telecommunications carriers in updating their customer accounts.

Figure 10:
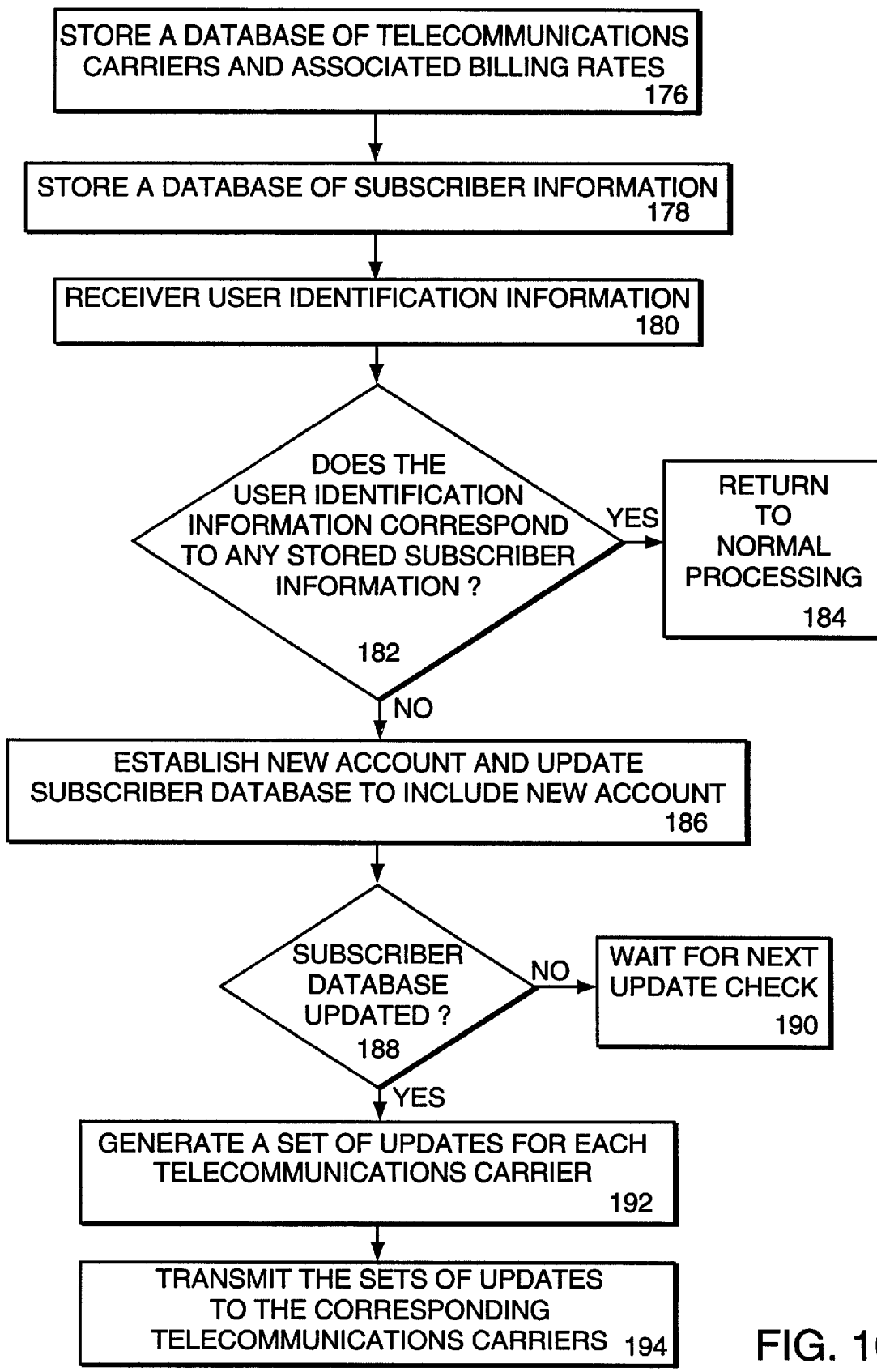
FIG. 10 is a flow chart representation of the steps performed by the central server to establish accounts for new subscribers at each telecommunications carrier.

FIG. 10 is a flow chart illustrating the steps performed by the central server 48 in one embodiment of the invention to establish accounts for new subscribers at each telecommunications carrier. As described above, the central server 48 stores a database of telecommunications carriers and associated billing rates (step 176). The central server 48 also stores a database of subscriber information (step 178). When a user's PC 14 contacts the central server 48, the central server receives user identification information from the user's PC 14 (step 180). Upon receipt of user identification information, in step 182, the central server determines if the user identification information corresponds to any stored subscriber information. The process for making this determination is described above in the discussion of FIG. 8. If the user identification information corresponds to the subscriber information of a current subscriber, the central server 48 proceeds to step 184, returns to normal processing and processes the call. If the user identification information does not correspond to the subscriber information of a current subscriber, the central server 48 proceeds to step 186 and establishes a new account for the user. Once the new account is established, the central server updates its database to include the new account.

In step 188, the central server periodically determines if its database has been updated to include new subscriber accounts. If the database has not been updated to include new accounts, the central server 48 proceeds to step 190 and waits for the next update check. In one embodiment, the central server 48 determines on an hourly basis if its database has been updated. If the database has been updated to include new accounts, the central server 48 generates a set of updates for each telecommunications carrier in its database in step 192. In step 194 the central server 48 transmits the sets of updates to the corresponding telecommunications carriers.

Figure 11:
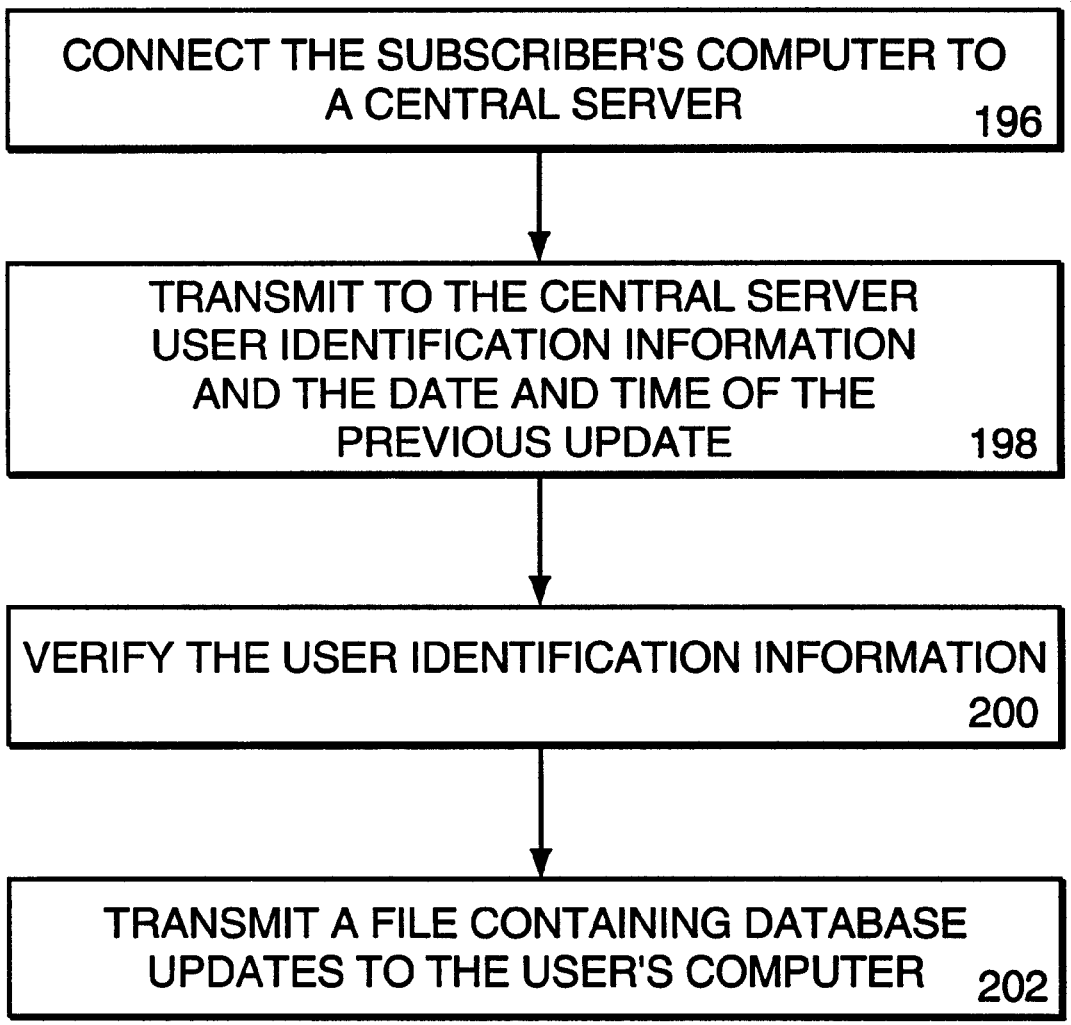
FIG. 11 is a flow chart representation of the steps performed by the user's computer and the central server to update the database of telecommunications carriers stored on the user's computer.

The central server 48 also periodically determines if any subscribers have canceled their service and sends a delete customer signal to the appropriate telecommunications carriers. In general, telecommunications carriers change their billing rates over time. In one embodiment of the present invention, the customized database stored on the user's PC 14 is updated by the central server 48. FIG. 11 is flow chart illustrating the steps performed by the user's PC 14 and the central server 48 to update the customized database of telecommunications carriers stored on the user's PC 14. In step 196, the user's PC 14 connects to the central server 48. After connection, the software 20 transmits to the central server user identification information and the date and time of the previous update (step 198). In step 200, the central server 48 verifies the user identification information. If the user identification information is verified, in step 202 the central server 48 transmits to the user's PC a file containing updates to the user's customized database. The central server 48 uses the user identification information (i.e. telephone number, special calling plans, etc.) and the date and time of the last update to determine the update information sent to the user's PC 14.

In one embodiment, the central server 48 only transmits additions and modifications to the user's customized database rather than sending a complete database to replace the existing database. In one such embodiment, the central server 48 generates a file for each of the telecommunications carriers in the user's customized database and a file for each telecommunications carrier to be added to the user's customized database. The central server 48 then transmits these files to the user's PC 14. The central server 48 generates a file for each telecommunications carrier in the user's customized database regardless if any modifications have been for each telecommunications carrier. Thus, in some instances, the central server 48 will send files which contain no information to the user's PC 14.

In one embodiment, the user's PC 14 will automatically attempt to connect with the central server 48 on a periodic basis and steps 198 through 202 will be repeated. In one such embodiment, the user's PC 14 attempts to connect with the central server once a month. In another such embodiment, the user is able to select the periodic basis at which the customized database is updated. If the user's PC 14 cannot connect with the central server 48 at the scheduled date and time, the user's PC 14 will attempt to connect to the central server as soon thereafter as possible. When the user's PC 14 makes another attempt, the software 20 will display a message screen asking the user if the user would like to update at that time. The user may allow the update to occur, postpone the time of the update, or cancel the update. The time from which the periodic basis is determined is reset according to the date and time of the next successful update.

For example, if the customized database is scheduled for an update on August 1st and the user's PC 14 is unable to receive a successful update until August 5th, the time for the next update will be calculated from August 5th (i.e. one month from August 5th). If the user's PC 14 misses a scheduled update due to the PC 14 being turned off, the software 20 will attempt to connect to the central server 48 when the PC 14 is turned on.

Figure 12:
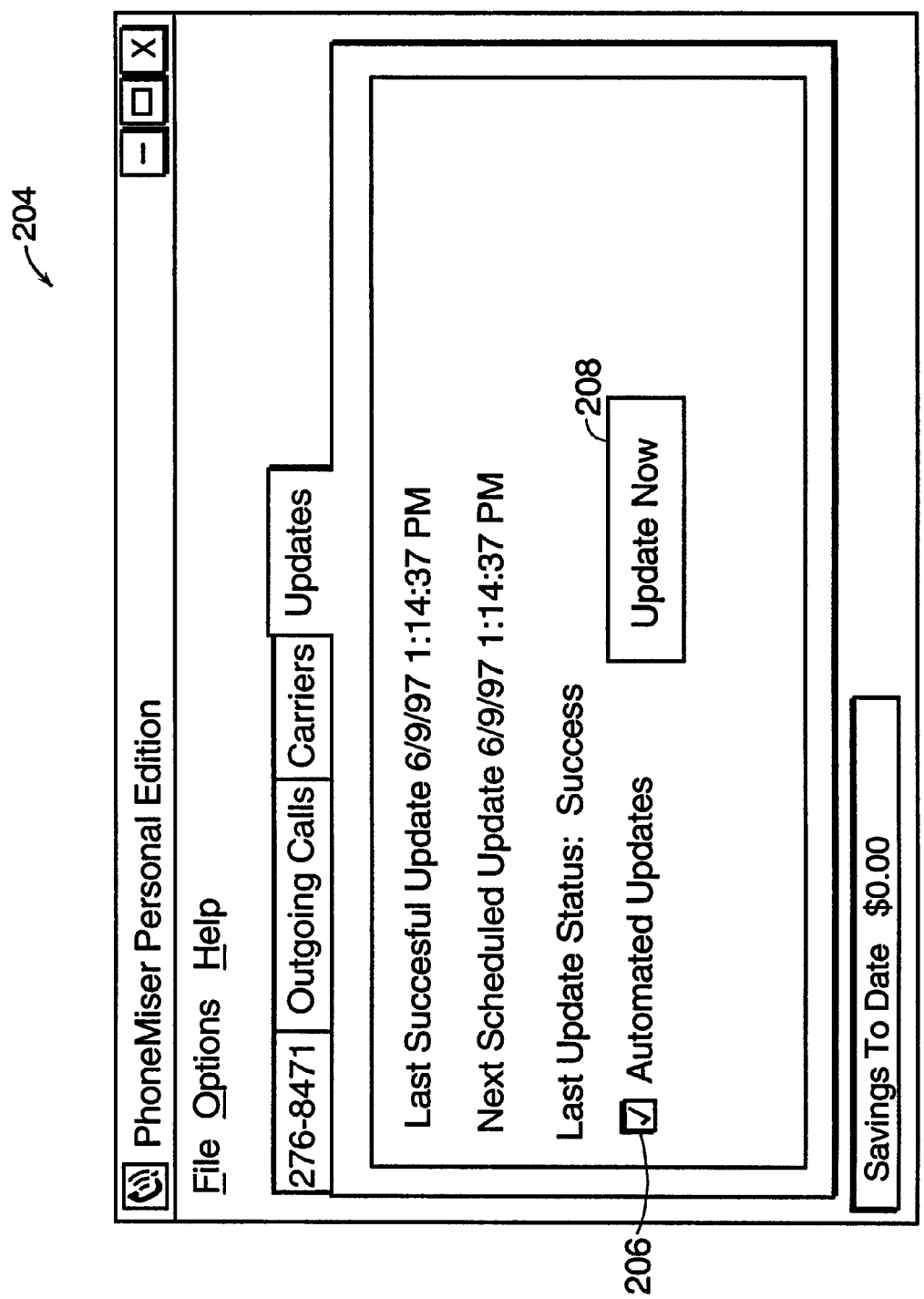
FIG. 12 is a pictorial view of a updates screen of a least cost telephone call routing system according to the invention.

In one embodiment, the user may access an updates screen on the user's PC 14 to determine the date of the next update. FIG. 12 shows an updates screen 204 which the user may access. The updates screen 204 displays the schedule for updating the user's customized database. The updates screen 204 displays the date of the last successful update and the date and time of the date and time that the user's PC 14 will automatically attempt to connect to the central server 48 to obtain an update.

In one embodiment, the user may override the automatic updating of the customized database by "un-checking" the box 206 labeled Automatic Updates. The user may reactivate the automatic updating process by re-checking the box 206 labeled Automatic Updates. The user may manually update the customized database by selecting the Update Now button 208.

Figure 13:
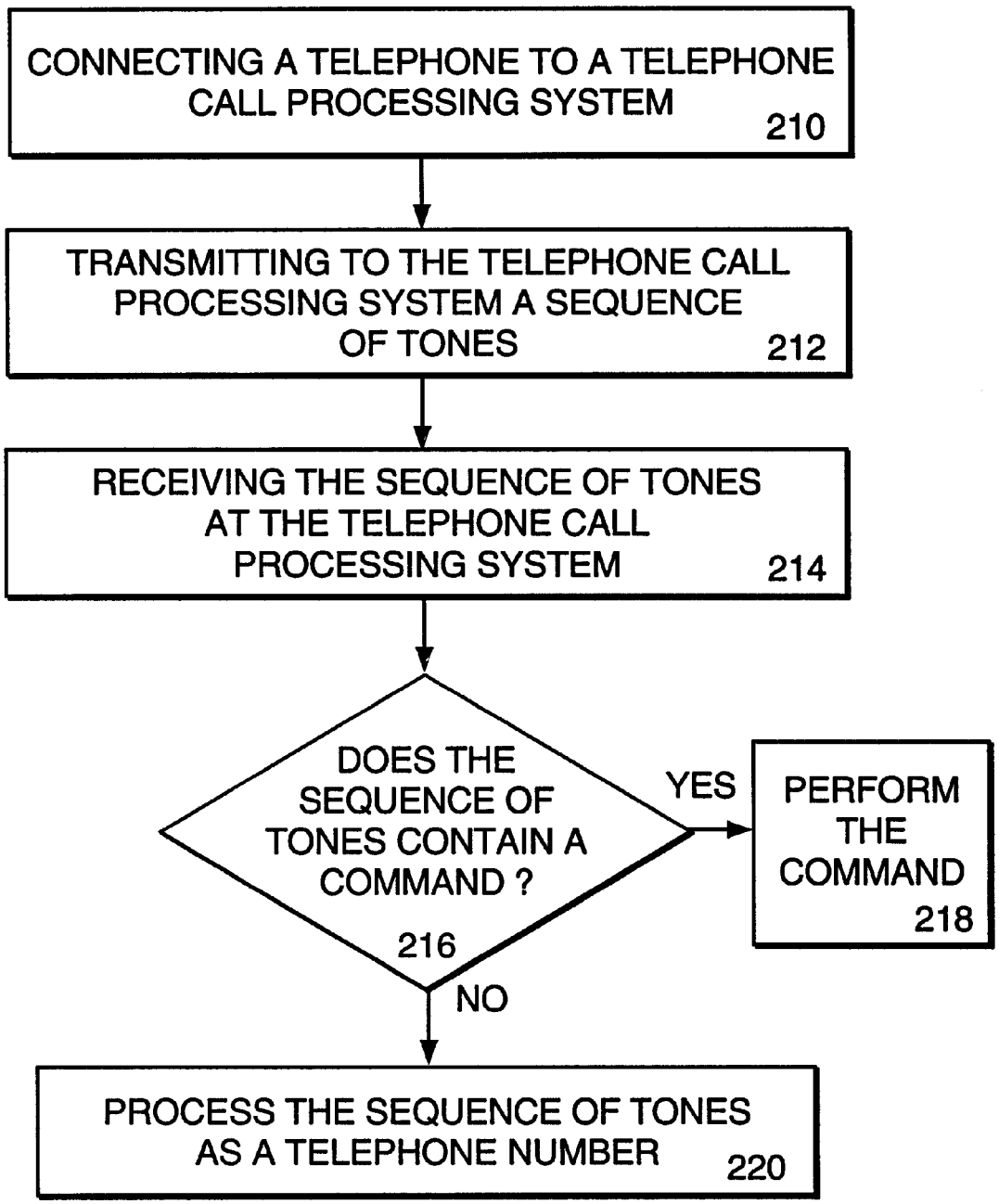
FIG. 13 is a flow chart representation of an embodiment of a process for controlling a telephone call processing system using a standard telephone.

In one embodiment, the system 10 may be controlled from the telephone keypad of one of the standard telephones 12a, 12b. The system 10 may be any type of call processing system, including a least cost call routing system. FIG. 13 is a flow chart illustrating an embodiment of a process for controlling the system 10 using a standard telephone 12a, 12b. In step 210, the telephone 12a or 12b is connected to the telephone call processing system 10. Next, in step 212, the user dials a sequence of digits on the telephone keypad. The sequence of digits contains a first predetermined digit, a series of digits representing a command to be performed by the telephone call processing system, and a second predetermined digit. Each digit in the sequence of digits is converted into a DTMF tone pair. The sequence of tone pairs is transmitted to the telephone call processing system as each digit is dialed (step 212). In step 214, the telephone call processing system receives the sequence of tone pairs. In step 216, the telephone call processing system determines if the sequence of tone pairs corresponds to a predetermined sequence of tones which contains a command or if the sequence of tone pairs is a telephone call to be processed. If the sequence of tone pairs contains a command, the system proceeds to step 218 and performs the command. If the sequence of tone pairs does not contain a command, the system proceeds to step 220 and processes the sequence of tone pairs as a telephone number.

In one embodiment, the first predetermined digit and the second predetermined digit are the same digit. In another embodiment, the first predetermined digit and the second predetermined digit are the # key on a telephone keypad. In yet mother embodiment, the first predetermined digit and the second predetermined digit are the * key on a telephone keypad. For example, the sequence of digits may be #XX# or *XX*. Any predetermined sequence of digits may be used as long as the sequence of digits do not correspond to a telephone number. Examples of commands include: suspending operation of the telephone call processing system, reactivating the telephone call processing system, and suspending operation of the telephone call processing system only for the first telephone call received by the call processing system after receipt of the command.

Figure 14:
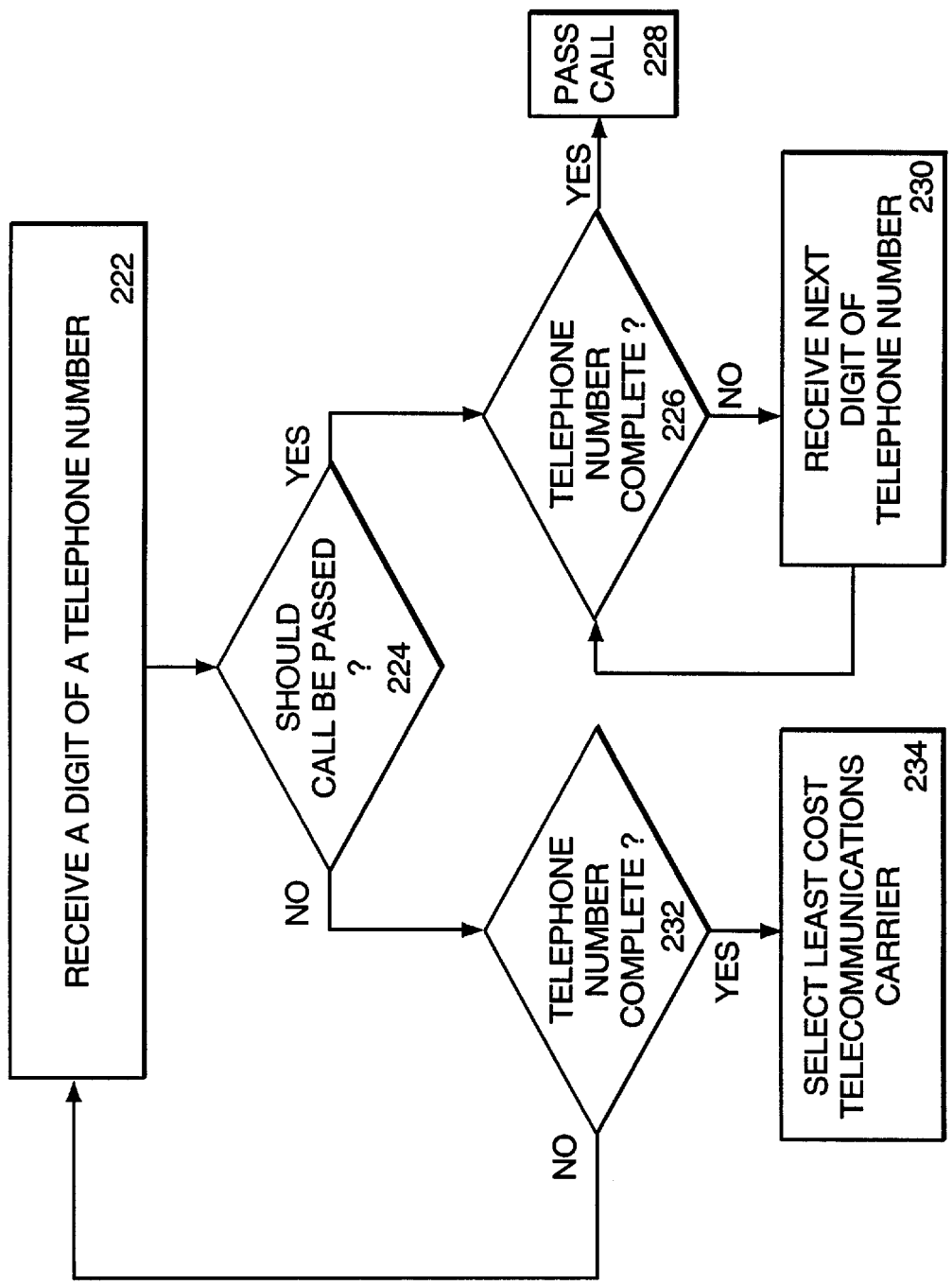
FIG. 14 is a flow chart representation of an embodiment of a process for determining whether a least cost telecommunications carrier should be selected for a telephone call.

FIG. 14 is a flow chart illustrating an embodiment of a process for determining whether the system 10 should select a least cost telecommunications carrier for a telephone call or whether the system 10 should simply pass the call. The software 20 will not determine a least cost telecommunications carrier for a telephone call if the telephone call is to a number within the user's local calling plan or if the call corresponds to a telephone number within a special calling plan subscribed to by the user. The software 20 also will not determine a least cost telecommunications carrier for a telephone call if the telephone call is to a special number, such as 911, 411, 0, *69, *70 or if the call is to an 800 or 900 number. The software 20 also recognizes if a CIC number is included in a dialed telephone number. Calls including CIC numbers will not be processed to select a least cost route. In step 222, the software 20 receives the first digit of a telephone number. The software then evaluates whether the call should be passed (step 224). For example, if the user dialed a "0", the software would determine that the call should be passed without selecting a least cost telecommunications carrier. If the software 20 determines that the call should be passed, the software 20 then proceeds to step 226 and determines if it has received all of the digits of the telephone call to be placed. The software 20 evaluates the string of digits received digit-by-digit to determine if more digits should be input by the user before placing the call. If all of the digits have been received, the software 20 passes the call (step 228). If all of the digits have not been received, the software 20 waits for the receipt of the next digit in step 230 and again determines if the telephone number is complete (step 226). The software repeats steps 226 and 230 until all of the digits of the telephone call have been received and the call can be placed (step 228).

If in step 224 the software does not determine that the call should be passed, the software 20 proceeds to step 232 and determines if the telephone number is complete. If the telephone number is complete, the software 20 proceeds to step 234 and selects a lest cost telecommunications carrier for the telephone call. If the telephone number is not complete, the software returns to step 222 and waits for the next digit. Steps 222, 224, and 232 are repeated until the software 20 determines that the call should be passed in step 224 or until every digit of the telephone number is received, whichever occurs first.

FIG. 15 shows a dialing options screen 236 which allows a user to customize the least cost telephone call routing system 10. For example, in some situations the user may need to dial a special number such as "9" to get an outside line or to su spend call waiting.

Figure 16:
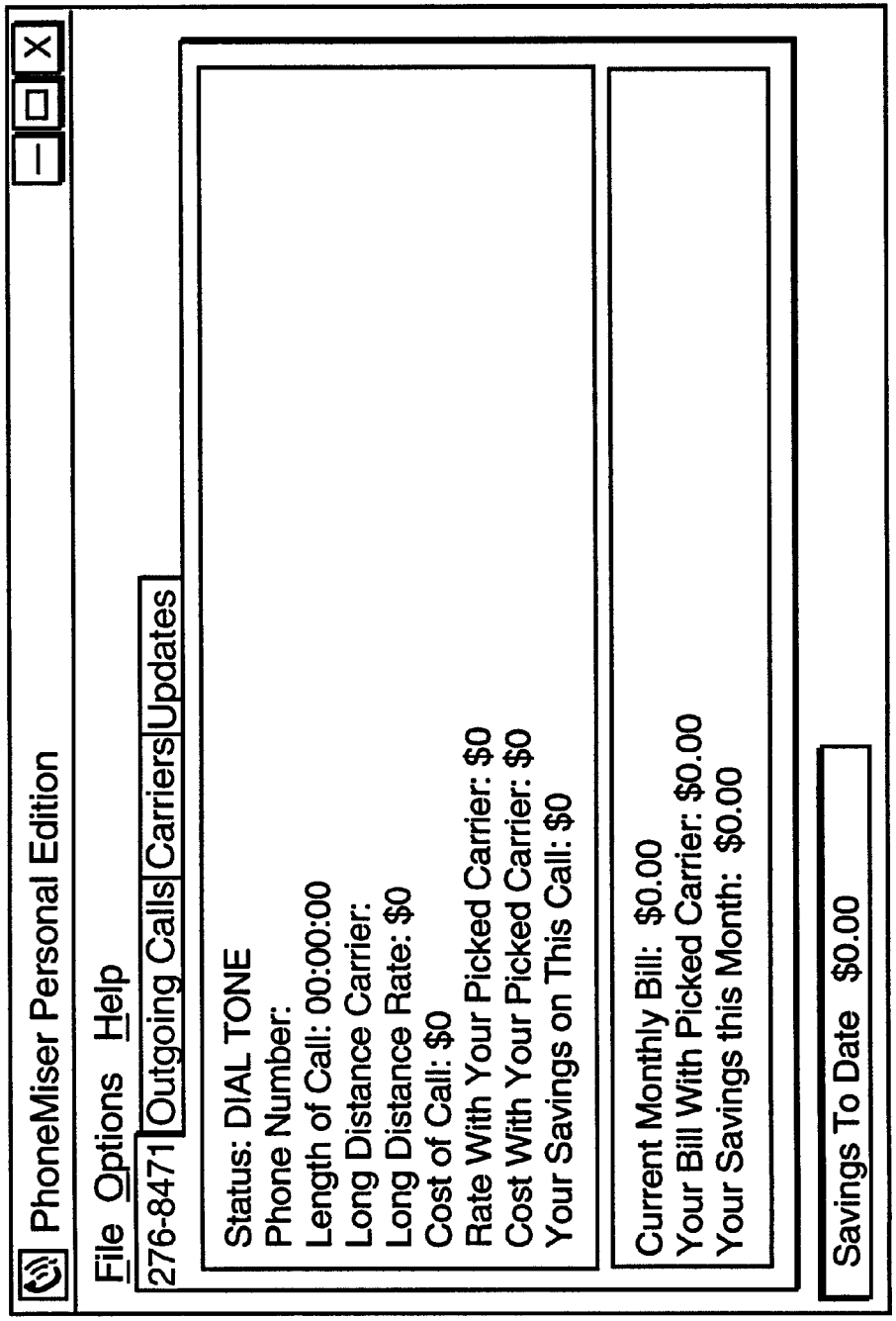
FIG. 16 is a pictorial view of a call status screen of a least cost telephone call routing system according to the invention.

FIG. 16 shows a call status screen 240 of a least cost telephone call routing system according to one embodiment of the invention. The call status screen 240 provides a record of the telephone call in progress. The Status field indicates whether the telephone call is outgoing, connected, dialing, etc. The phone number field displays the telephone number being called. The Length of Call field provides the approximate duration of the outgoing call in progress. The Long Distance Rate field displays the cost per minute of the call. The Long Distance Carrier field displays the telecommunications carrier selected by the software 20 to route the call. The Cost of Call field displays the read time cost of the call in progress. The software 20 calculates the cost of the call in the same manner as the telecommunications carrier. For example, if the telecommunications carrier bills in whole minute intervals, the software 20 calculates the cost of the call using whole minute intervals. The field labeled Rate With Your Picked Carrier estimates what the total cost of a phone call would have been had the call be routed through the user's default carrier. The field labeled Your Savings On This Call calculates the difference in cost between the user's default carrier and the carrier selected by the software 20. The field labeled Current Monthly Bill calculates the total amount of money spent on long distance calls routed through the system 10 since the beginning of the calendar month. The field labeled Your Bill With Your Picked Carrier calculated the user's hypothetical monthly bill had the user made each call through the default carrier. The field labeled Your Savings This Month displays the money saved by the user in using the system 10. The field labeled Savings to Date displays the amount of money the user has saved since the user began using the system 10.

FIG. 17 shows an outgoing calls screen 242 of a least cost telephone call routing system 10 according to the invention. The outgoing calls screen 242 displays a log of all outgoing calls made through the system 10 on a daily basis.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method for establishing and updating customer accounts at a plurality of telecommunications carriers in a least cost call routing system, comprising the steps of:

storing a plurality of telecommunications carriers and associated billing rates on a server;

storing subscriber identification information and a telephone number for each current subscriber on the server;

receiving user identification information from a user's computer over a first telephone line having a first telephone number;

determining if the user identification information corresponds to any of the stored subscriber identification information;

if the user identification information does not correspond to any of the stored subscriber identification information, establishing a new account for the first telephone number on the server; and if the user identification information corresponds to the stored subscriber identification information of one of the current subscribers, performing the steps of:

determining if the user identification information is identical to the stored subscriber information for that current subscriber; and if the user identification information is not identical to the stored subscriber information for that current subscriber updating the stored subscriber information on the server and transmitting from the server to each carrier providing service to the current subscriber modifications to the stored subscriber information;

if the user identification information is identical to the stored subscriber information for that current subscriber, returning to normal processing.

2. A method for updating customer accounts at a plurality of telecommunications carriers in a least cost call routing system, comprising the steps of:

storing a first database including a plurality of telecommunications carriers and associated billing rates on a server;

storing a second database including subscriber information and a customized database of telecommunications carriers and associated billing rates for each current subscriber on the server, the subscriber information including subscriber identification information and a telephone number;

updating the second database upon receipt of updated subscriber information from a subscriber's computer;

determining on a periodic basis if the second database has been updated;

if the second database has been updated, generating a set of updates for each telecommunications carrier in the first database, each set of updates only including update information for subscribers receiving service from the telecommunications carrier; and transmitting the sets of updates to corresponding telecommunications carriers for use in modifying customer accounts;

if the second database has not been updated, returning to normal processing.

3. A method for establishing customer accounts at a plurality of telecommunications carriers in a least cost call routing system, comprising the steps of:

storing a first database including a plurality of telecommunications carriers and associated billing rates on a server;

storing a second database including subscriber information for each current subscriber on the server, the subscriber information including subscriber identification information and a telephone number;

receiving user identification information from a user's computer over a first telephone line having a first telephone number;

determining if the user identification information corresponds to subscriber identification information of a current subscriber;

if the user identification information does not correspond to the subscriber identification information of any current subscribers, establishing a new account for the first telephone number and updating the second database to include the new account;

determining on a periodic basis if the second database has been updated to include new accounts;

if the second database has been updated, generating a set of updates for each telecommunications carrier in the first database, each set of updates only including update information for new subscribers that are eligible to receive service from the telecommunications carrier; and transmitting the sets of updates to corresponding telecommunications carriers for use in establishing new customer accounts, if the second database has not been updated, returning to normal processing.

* * * * *